United States Patent
Gomez et al.

(10) Patent No.: US 9,976,814 B2
(45) Date of Patent: May 22, 2018

(54) SWITCHABLY ACTIVATED HEAT TRANSFER WITH MAGNETIC FLUID

(71) Applicant: Seagate Technology LLC, Cupertino, CA (US)

(72) Inventors: Kevin Arthur Gomez, Eden Prairie, MN (US); Jon Trantham, Chanhassen, MN (US); David Tetzlaff, Minnetonka, MN (US); Mai A. Ghaly, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 372 days.

(21) Appl. No.: 14/606,243

(22) Filed: Jan. 27, 2015

(65) Prior Publication Data
US 2016/0216043 A1 Jul. 28, 2016

(51) Int. Cl.
| F25B 21/02 | (2006.01) |
| F28D 15/06 | (2006.01) |
| F28F 13/06 | (2006.01) |
| F25B 21/00 | (2006.01) |
| F28D 15/04 | (2006.01) |

(52) U.S. Cl.
CPC ............. *F28D 15/06* (2013.01); *F25B 21/00* (2013.01); *F25B 21/02* (2013.01); *F28D 15/04* (2013.01); *F28F 13/06* (2013.01); *F25B 2321/0022* (2013.01); *F25B 2321/0212* (2013.01); *Y02B 30/66* (2013.01)

(58) Field of Classification Search
CPC .......... F28D 15/06; F28D 13/06; F25B 21/00; F25B 21/02; F25B 2321/0212; F25B 2321/0022; F25B 21/04
See application file for complete search history.

(56) References Cited

U.S. PATENT DOCUMENTS

| 7,104,313 | B2 | 9/2006 | Pokharna et al. | |
| 2009/0308081 | A1 | 12/2009 | Ouyang et al. | |
| 2010/0071883 | A1 | 3/2010 | Vetrovec | |
| 2012/0199320 | A1 | 8/2012 | Richardson et al. | |
| 2013/0091868 | A1* | 4/2013 | Campbell | F25B 21/02 62/3.2 |
| 2013/0148301 | A1* | 6/2013 | Dede | F25B 21/00 361/702 |
| 2013/0180263 | A1* | 7/2013 | Choi | F25B 21/00 62/3.1 |

* cited by examiner

*Primary Examiner* — Len Tran
*Assistant Examiner* — Ana Vazquez
(74) *Attorney, Agent, or Firm* — Hollingsworth Davis, LLC

(57) ABSTRACT

An apparatus includes a heat pipe with a fluid path. A first part of the fluid path is thermally coupled to a first region of a higher temperature and a second part of the fluid path thermally is coupled to a second region of a lower temperature. A difference between the higher temperature and the lower temperature induces a flow of a magnetic fluid in the fluid path. A switchable magnetic device is magnetically coupled to the fluid path. Activation of the switchable magnetic device reduces the flow of the magnetic fluid in the fluid path, which reduces heat transfer from the first region to the second region.

18 Claims, 6 Drawing Sheets

SWITCHABLY ACTIVATED HEAT TRANSFER WITH MAGNETIC FLUID

SUMMARY

The present disclosure is related to systems and methods for switchably activating and deactivating a heat transfer path that includes magnetic fluid. In one embodiment, an apparatus includes a heat transfer mechanism with a fluid path. A first part of the fluid path is thermally coupled to a first region of a higher temperature and a second part of the fluid path thermally is coupled to a second region of a lower temperature. A difference between the higher temperature and the lower temperature induces a flow of a magnetic fluid in the fluid path. A switchable magnetic device is magnetically coupled to the fluid path. Activation of the switchable magnetic device reduces the flow of the magnetic fluid in the fluid path, which reduces heat transfer from the first region to the second region.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to managing heat in electronic devices. While most heat management systems are designed to remove heat from electronic components, there are situations when it is desirable to add heat to components. Embodiments described below can selectably move heat from a heat-generating component to a heat-receiving component. A heat transfer path can be electronically turned off and on to maintain a target temperature at the heat-receiving component and/or the heat-receiving component. Other heat transfer paths can be switched on at or near the same time to move the unused heat elsewhere, e.g., a heat sink.

Figure 1:
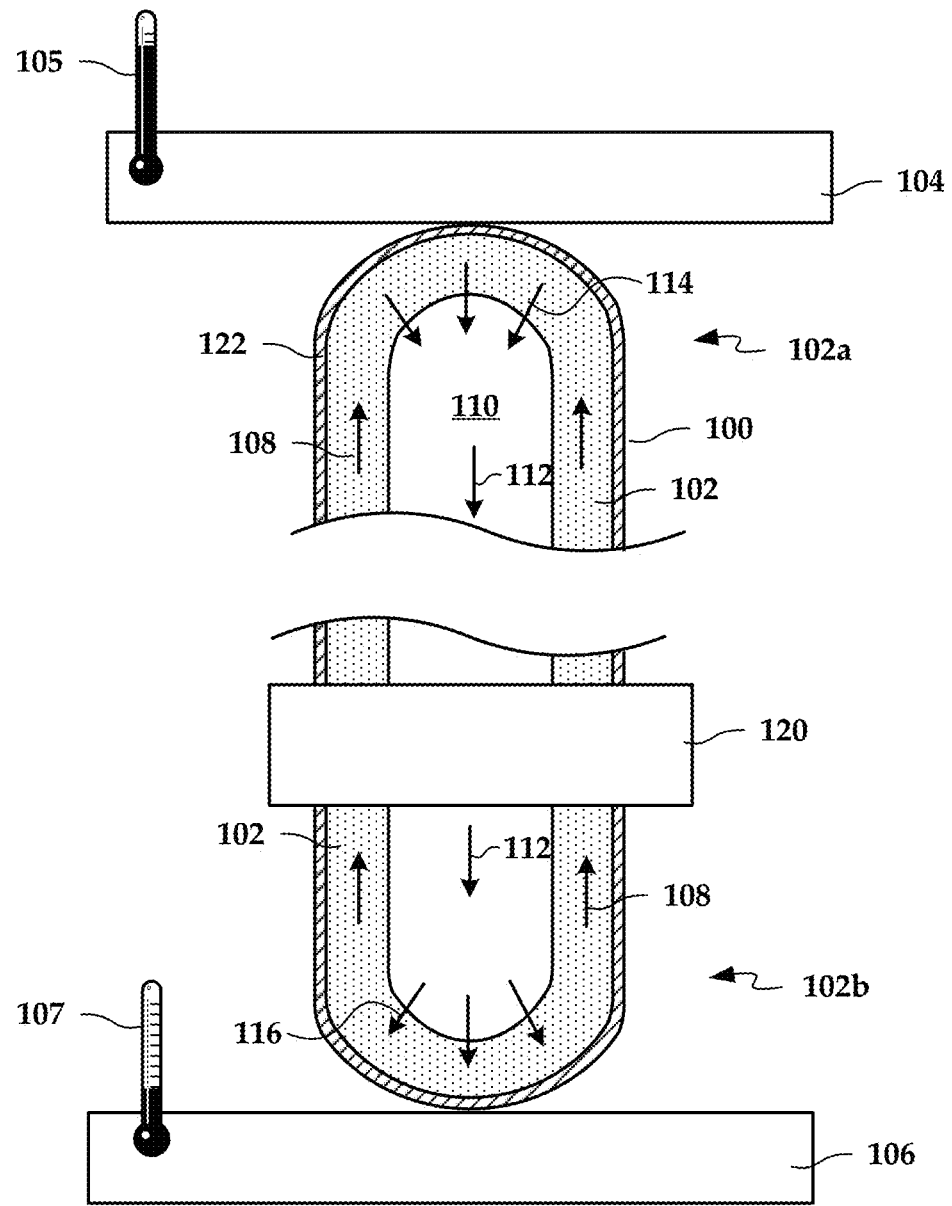
FIG. 1 is a cross-sectional view of a heat pipe according to an example embodiment.

Generally, the embodiments described herein utilize heat pipes as a heat transport mechanism. In FIG. 1, a block diagram illustrates a cross-section of a heat pipe 100 according to an example embodiment. The heat pipe 100 includes a fluid path 102. A first part 102a of the fluid path is thermally coupled to a first region 104 of a higher temperature 105. A second part 102b of the fluid path is thermally coupled to a second region 106 of a lower temperature 107. A difference between the higher temperature and the lower temperature induces a flow 108 of a magnetic fluid (e.g., ferromagnetic fluid) in the fluid path 102. The fluid path 102 may include a wicking material or other capillary flow media to facilitate this flow 108. The magnetic fluid may include working fluids currently used in heat pipes (e.g., water, ethanol, acetone) that includes additives such as particles of iron, nickel, cobalt, or other magnetic materials.

The heat pipe 100 includes a vapor cavity 110 that may be formed as a void between solid material (e.g., wicking) in the fluid path 102. At the hotter first region 102a, the working fluid evaporates, forming a vapor 112 that enters the vapor cavity 110 as indicated by arrows 114. The evaporation absorbs heat from the first region 102a. The vapor 112 migrates along the vapor cavity 110 to the colder second region 102b, where it condenses and is absorbed 116 by the material in the fluid path 102. The condensation releases heat energy, which adds heat to the second region 102b. The magnetic fluid then flows back to the hotter, first region 102a where the process repeats.

A switchable magnetic device 120 (e.g., an electrical coil, movable permanent magnet) is magnetically coupled to the fluid path 102. Activation of the switchable magnetic device 120 applies a localized magnetic field that reduces the flow 108 of the magnetic fluid in the fluid path 102. For example, if the magnetic fluid includes small particles of magnetic materials, activation of the magnetic device 120 may cause some or all the particles to aggregate in a single region, thereby blocking passageways in a wicking material of the fluid path 102. Reducing the flow 108 reduces a transfer of heat energy from the first region 104 to the second region 106. Similarly, deactivation of the switchable magnetic device 120 removes the magnetic field, allowing the particles to disperse. This clears the blockage allowing transfer of heat to continue via the fluid flow.

When the switchable magnetic device 120 is activated, convective heat flow stops or reduces due to the interruption in the capillary flow. There may still be some conductive heat transfer, which may be considerably less effective than the convective heat transfer. The heat pipe 100 includes a casing 122 that may be made of a material with relatively low thermal conductivity, at least in the region near the switchable magnetic device 120. This may further inhibit conductive heat transfer when the switchable magnetic device 120 is activated. The blocking of fluid flow interrupts the evaporation-condensation cycle, at least for any branches controlled by the switchable magnetic device 120.

If the relative pressure inducing the magnetic fluid is relatively small, the flow may require some time to disperse the blockage of magnetic fluid in a capillary flow medium. The switchable magnetic device 120 may include features that promote the dispersion of magnetic particles more quickly after deactivation. For example the switchable magnetic device 120 may include a number of magnetic elements (e.g., electrical coils) that are individually switchable. The magnetic elements may all be activated to stop or decrease fluid flow, and then individually pulsed to dislodge the particles before removing the magnetic field completely, allowing flow to start or increase. This pulsing may involve activating individual coils along a path to drag particles along the path, and/or reversing polarity of the magnetic field rapidly to vibrate the particles back and forth.

Figure 2:
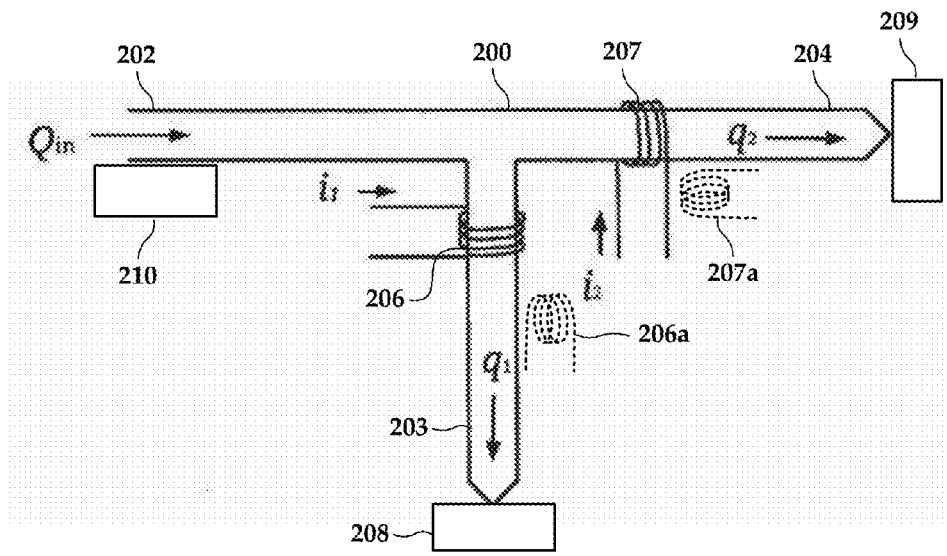
FIG. 2 is a block diagram illustrating a heat transfer control element with at least two heat pipe branches according to an example embodiment.

In reference now to FIG. 2, a block diagram illustrates a heat transfer control element with at least two heat pipe branches according to an example embodiment. A heat pipe 200 includes an input end 202 and two output ends 203, 204 that branch off from the input end. The heat pipe 200 includes an internal fluid path that thermally couples the ends 202-204. As indicated in the diagram, heat flux $Q_{in}$ enters the input end 202 and exits one or both the output ends 203, 204 as $q_1$ and/or $q_2$. It will be understood that the heat may flow in different directions than illustrated, e.g., in or out of the ends 202-204 in any combination. It will also be understood that this example may be extended to more than two branches.

Two switchable magnetic devices, electrical coils 206 and 207, are positioned near the branch between the output ends 203, 204. The coils 206, 207 are magnetically coupled to the fluid path, and independent activation of the coils 206, 207 between endpoints of the heat pipe 200 can reduce the flow of a magnetic fluid in the fluid path. This can result in reducing of the flow of heat flux between the input end 202 and one or both output ends 203, 204, or vice versa. The coils may be oriented differently than shown for coils 206, 207, as indicated by alternate coils 206a, 207a.

For example, output end 204 may be thermally coupled to a target component at region 209 to which heat may be occasionally applied, and output end 203 may be thermally coupled to a heat sink at region 208. Input end 202 is coupled to a source component at region 210 from which heat is desired to be removed, e.g., a processor. Heating of the target component involves deactivating coil 207 and activating coil 206. This allows magnetic fluid to flow between the input end 202 and the target component at output end 204, and blocks fluid flow between the input end 202 and the heat sink at output end 203. When enough heat has been applied to the target component, coil 206 is deactivated and coil 207 is activated. This allows magnetic fluid to flow between the input end 204 and the heat sink at output end 203, and blocks fluid flow between the input end 202 and the target component at output end 202.

In the illustrated example, two branches of output ends 203 and 204 are coupled to regions 208, 209 of lower temperature, and input end 202 is coupled to a region 210 of higher temperature. The use of the term "lower" and "higher" generally indicates at least the output ends 203, 204 have a lower temperature than the input end 202, although output ends 203, 204 may have different temperatures relative to each other. Independent activation of the coils 206, 207 independently alters magnetic fluid flows from the input end 202 to the first and second branches, which alters a transfer of the energy from the region 210 to regions 208, 209.

The alteration flows from the region 210 to regions 208, 209 may include completely shutting off flow to one or both of the output ends 203, 204, or balancing a flow therebetween. For example, some applications may try to maintain regions 208, 209 at an equal temperature (or maintain some other relative temperature difference or distribution), and so may partially activate coils 206, 207 to partially throttle fluid flow to achieve this. Throttling may also be achieved by activating and deactivating particular coils 206, 207 for a particular amount of time, similar to pulse-width modulation used to change an amount of power applied to electrical devices.

Conversely, the two branches with ends 203 and 204 may be coupled to regions 208, 209 of higher temperature, and end 202 may be coupled to a region 210 of lower temperature. The use of the term "lower" and "higher" generally indicates at least the ends 203, 204 have a higher temperature than the end 202, although ends 203, 204 may have different temperatures from each other. Independent activation of the coils 206, 207 independently alters magnetic fluid flows from the first and second branches to end 202, which alters a transfer of the energy from the regions 208, 209 to region 210. As with the above example, this may be used to shut off flows at branches and/or balance flows between branches.

The heat transfer systems as described herein may be used in a number of applications. For example, in a solid-state, nonvolatile data storage device that uses NAND flash memory, NAND flash memory cells can degrade due to charge trapping. Charge trapping lowers the tunneling barrier and can lead to increase in leakage currents, which in turn may result in degraded retention and signal-to-noise ratio (SNR). This degradation can be exacerbated in cells that store multiple bits per cell, such as multi-level cell (MLC) and triple-level cell (TLC) NAND flash.

One technique which has been show to reverse this damage, e.g., detrap charges from the oxide, is known as thermal annealing. Thermal annealing may be performed in conjunction with erasure of cells, and involves applying locally high temperatures to the cells. Thermal annealing uses temperature and time to repair electron-induced stresses in the memory, significantly extending life. The higher the temperature, the more effective the annealing. As a first order approximation, the annealing rate could be described by the Arrhenius equations [1] and [2] below, where N is the number of interfacial defects at time instant t; $N_{int}$ is an initial number of defects; $E_a$ is 0.52 eV (activation energy of H in Si—H bond); $K_B$ is the Boltzmann constant; $k_0$ is the pre-exponential factor; and T is temperature in Kelvin.

$$\frac{\Delta N =}{N_{int}} = -k\Delta t \qquad [1]$$

$$k = k_0 e^{\frac{E_a}{K_B T}} \qquad [2]$$

Using this equation, increasing temperature by 40 C (from 308K to 348K) can accelerate the annealing process by a factor of about 117. A heat pipe system as described herein may be used as part of a thermal annealing system for a flash solid-state drive (SSD). For example, the device can detect a condition indicating charge trapping of memory, and cause a heat pipe to apply heat to the memory cells in response. The condition may be detected directly, e.g., via measures such as error rates, or indirectly, e.g., via measures such as cell age and/or wear.

Figure 3:
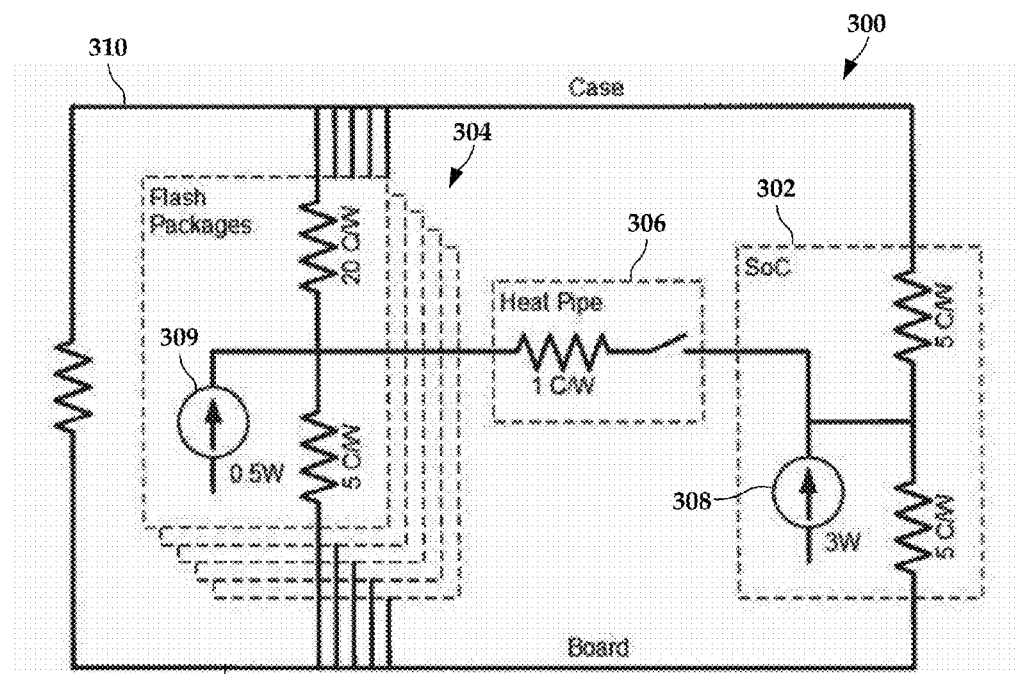
FIG. 3 is a diagram illustrating a heat transfer model of a data storage device according to an example embodiment.

In reference now to FIG. 3, a diagram illustrates a lumped capacitive heat transfer model of a data storage device 300 according to an example embodiment. The storage device 300 includes a controller 302, e.g., system on a chip (SoC). A plurality of flash packages 304 are thermally coupled to the controller 302 by way of a switchable heat pipe 306. The flash packages 304 may include flash media engines and a NAND flash die stack. The switchable heat pipe 306 can selectably apply heat to portions of a selected one or more of the flash packages 304 for thermal annealing or other purposes.

In this diagram, thermal components are modeled as electrical components. For example, current sources 308, 309 represent heat sources within the respective controller 302 and flash packages 304. The resistors in the diagram represent resistance to heat flow between components using any combination of heat transfer mechanisms, e.g., conduction, convection, radiation. A case 310 and circuit board 311 represent heat sinks. The thermal resistance of the heat pipe 306 is lower than resistances between the heat sinks and controller 302 and flash packages 304. As such, a temperature increase in the flash packages 304 can be caused by activating the heat pipe 306.

Other components may also assist in the transfer of heat between the controller 302 and flash packages 304. For example, a Peltier heat pump (not shown) can be used if a temperature differential is needed between components in the system. A Peltier heat pump, also referred to as a thermoelectric heater/cooler, is a solid-state device the can create a heat flux between a junction of two different materials in response to an applied current. A Peltier heat pump can be modeled as a bipolar current source in a lumped capacitive model. If there is insufficient heat in the controller 302 to raise the flash packages 304 to the target temperature, a Peltier heat pump may be included between the controller 302 and heat pipe 306 to lower the controller temperature and raise the target flash temperature, at the cost of additional system power. Another way to achieve this is make the resistances between the controller 302 and the case 310 and/or the controller 302 and the circuit board 311 switchable, e.g., via one or more switchable heat pipes. Other heaters may also be used with or in place of a Peltier heat pump to provide additional heat, such as resistive heaters.

In another embodiment, the controller 302 may include power-scalable performance. This may involve changing logic clock speed and/or activating or deactivating processing components such as cores or coprocessors. With the heat pipe 306 switched on (and possibly the inclusion of a Peltier heat pump), it may be possible to push the controller performance to a higher level than would be supported by passive cooling. These periods of increase controller performance could be scheduled with thermal annealing to minimize overall energy usage. During these periods of higher activity, background processing or other delayed processing may be performed to utilize the extra processing capacity.

Figure 4:
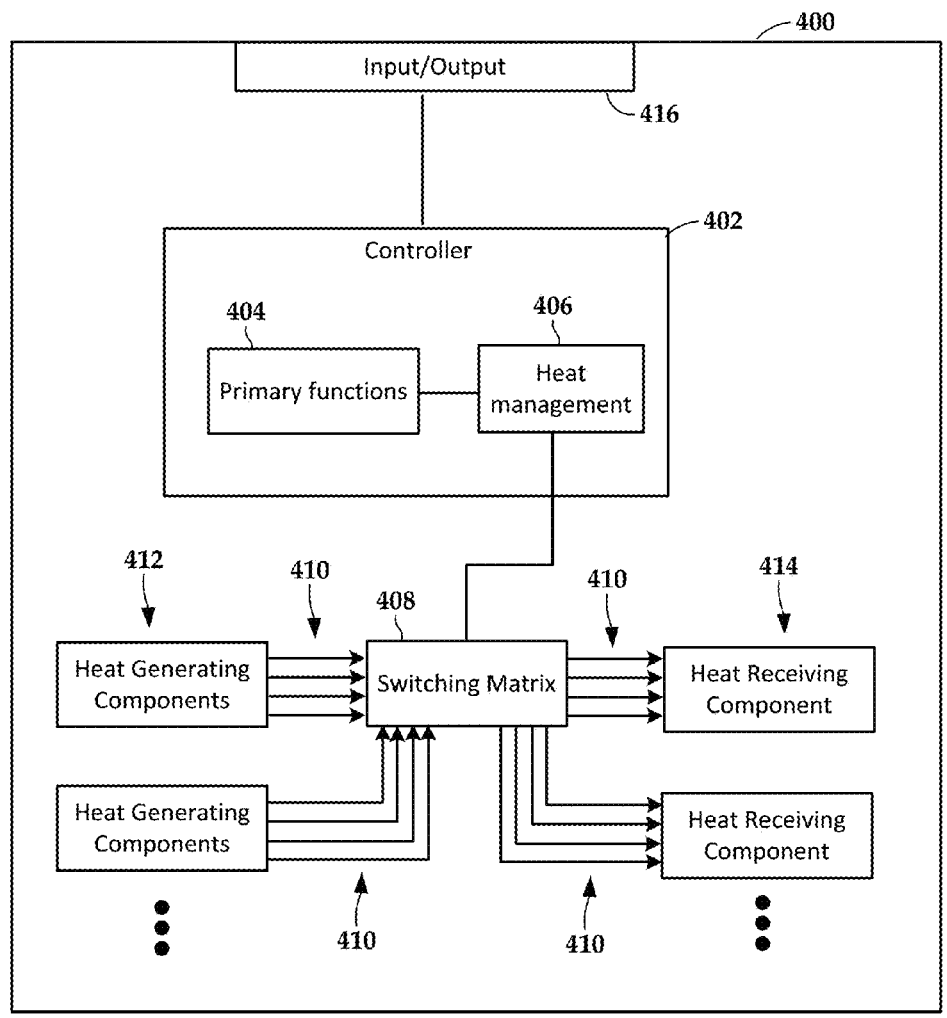
FIG. 4 is a block diagram illustrating an apparatus according to an example embodiment.

In FIG. 4, a block diagram illustrates an apparatus 400 according to another example embodiment. The apparatus 400 may include a special-purpose or general-purpose electronic device, and includes at least some logic circuitry and/or processing unit as indicated by controller 402. The controller 402 may include any combination of processing devices, from a small, specialized logic unit to a fully featured, general-purpose central processing unit (CPU). The controller 402 may have a set of primary functions 404, as indicated by the block within the controller 402. The primary functions 404 may be implemented in hardware, firmware, and/or software. The primary functions 404 execute operations associated with purpose of the apparatus 400, such as operating as a storage device, router, sensor, user interface device, transducer, etc.

A heat management component 406 also runs via the controller 402, and may be implemented in any combination of hardware, firmware, and/or software. The heat management component 406 controls a switching matrix 408 that includes a plurality of magnetic devices (e.g., coils) that control the heat pipes 410. The heat pipes 410 couple one or more heat-generating components 412 with one or more heat-receiving components 414, and do so selectably in response to commands from the heat management component 406.

The heat from the heat-generating components 412 may be waste heat, or may be specifically generated for purposes of inducing or increasing heat transfer via the heat pipes 410. For example, the heat-generating components 412 may include Peltier pumps or resistive heaters to provide additional heat on demand. Peltier heat pumps may be coupled between the heat pipes 410 and heat-generating components 412. Alternately or in addition, Peltier heat pumps may be coupled between the heat pipes 410 and heat-receiving components 414. The heat pipes 410 may include any combination of branched heat pipes and single-input, single-output heat pipes.

The heat management component 406 can direct heat as needed within the apparatus 400 for specific purposes, e.g., in response to a detected condition which can be assisted by the transfer of heat to the heat-receiving components 414. Heat flowing through respective heat pipes 410 can be individually altered. For example, heat can be directed to flash packages to cause or assist with thermal annealing. If multiple heat-generating components 412 are available (e.g., power supplies, processors, memory controllers) then individual ones can be selected in any combination to ensure the desired amount of annealing heat. Multiple heat sources may be also be activated if multiple heat-receiving components 414 need heat at the same time.

In other applications, the heat may be independently directed to multiple heat-receiving components 414 for conditions that may be assisted by causing a more uniform distribution of heat to reduce thermal stresses caused by thermal expansion, maintaining a constant temperature for components whose performance may vary with temperature, etc. It should be also noted that heat need not always flow in one direction as illustrated. The direction of heat flow is generally determined based on relative temperature of another component to which the device is thermally coupled. As such, a device may be a heat-receiving component at one time, and then be a heat-generating component at another time. Therefore, the switching matrix 408 and heat pipes 410 may operate bi-directionally, as well as any other heat transfer components such as Peltier heat pumps.

The instructions for distributing heat based on detected conditions may be determined internally, e.g., via primary functions 404. For example, thermal annealing heat transfer may be initiated as part of an internally-initiated erase operation. In other cases, the instructions for distributing heat may come from conditions detected by an external source via input/output interface 416. For example, a system-wide temperature controller may dictate to this and similar apparatuses that waste heat be routed to alternate heat sinks based on conditions such as system load, failure of particular cooling units (e.g., cooling fans), etc.

Figure 5:
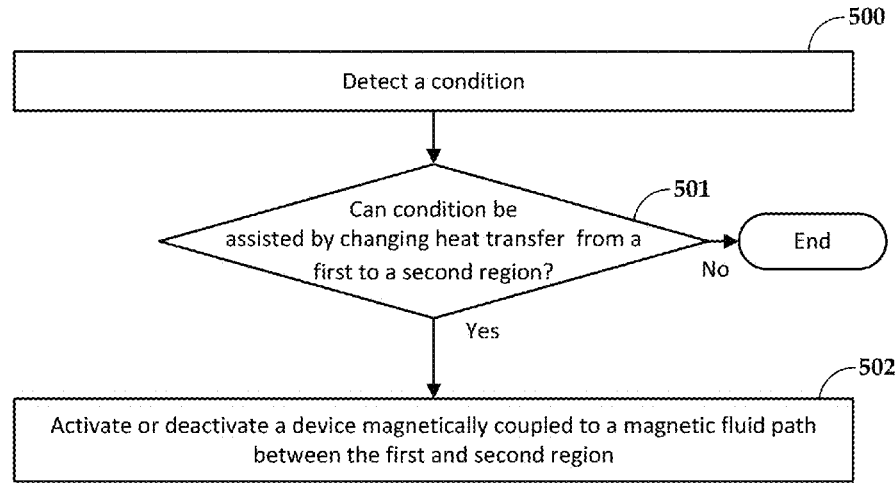
FIGS. 5 and 6 are flowcharts of methods according to example embodiments.

In FIG. 5, a flowchart illustrates a method according to an example embodiment. The method involves detecting 500 a condition of an apparatus. The condition might be assisted (e.g., alleviate a problem or enhance an operation) by changing a heat transfer from a first region of a higher temperature to a second region of a lower temperature, as indicated by block 501. A heat pipe is thermally coupled between the first region and the second region. If the condition can be assisted by the heat transfer, then a magnetic device magnetically coupled to a fluid path of the heat pipe is activated or deactivated 502 to respectively decrease or increase a flow of a magnetic fluid in the fluid path. The decreasing or increasing of the flow respectively decreases or increases the heat transfer to assist the detected condition.

Figure 6:
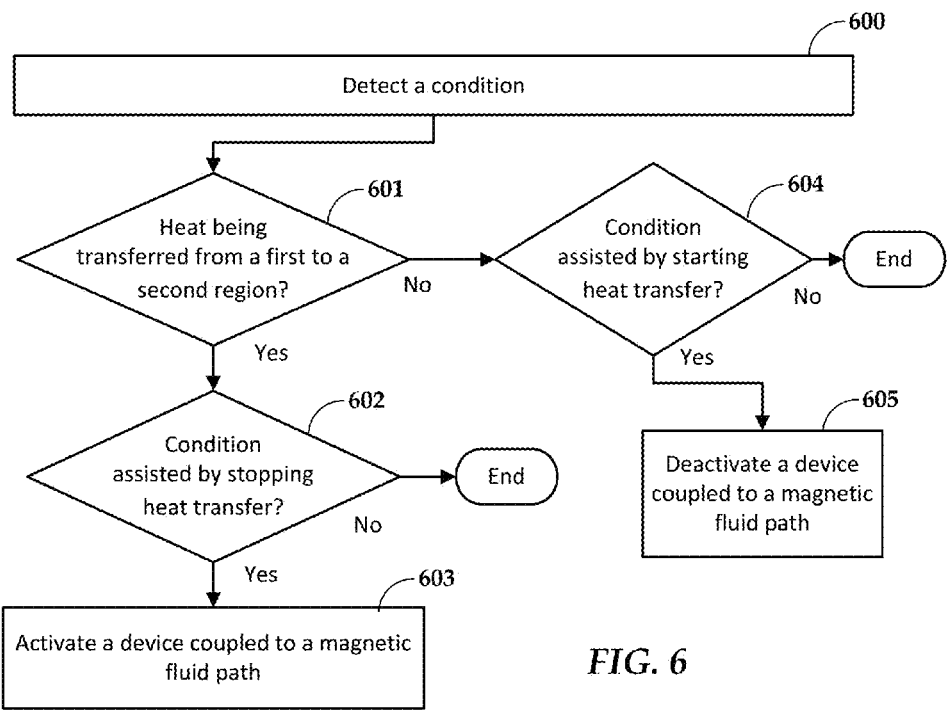

In FIG. 6, a flowchart illustrates a method according to another example embodiment. The method involves detecting 600 a condition of an apparatus. The condition might be assisted (e.g., alleviated and/or enhanced) by changing a heat transfer from a first region of a higher temperature to a second region of a lower temperature. If heat is currently being transferred from the first to the second region as determined at block 602, then it is determined whether stopping the heat transfer will assist in the condition, as decided at block 602. If so, a device magnetically coupled to a magnetic fluid path of the heat pipe is activated 603. This results in stopping or decreasing magnetic fluid flow from the first to the second region, which stops or decreases heat transfer caused by the flow.

If it is determined at block 601 that heat is not currently being transferred from the first to the second region, then it is determined whether starting the heat transfer will assist in the condition, as decided at block 604. If so, a device magnetically coupled to a magnetic fluid path of the heat pipe is activated 605. This results in starting or increasing magnetic fluid flow from the first to the second region, which starts or increases heat transfer caused by the flow.

Figure 7:
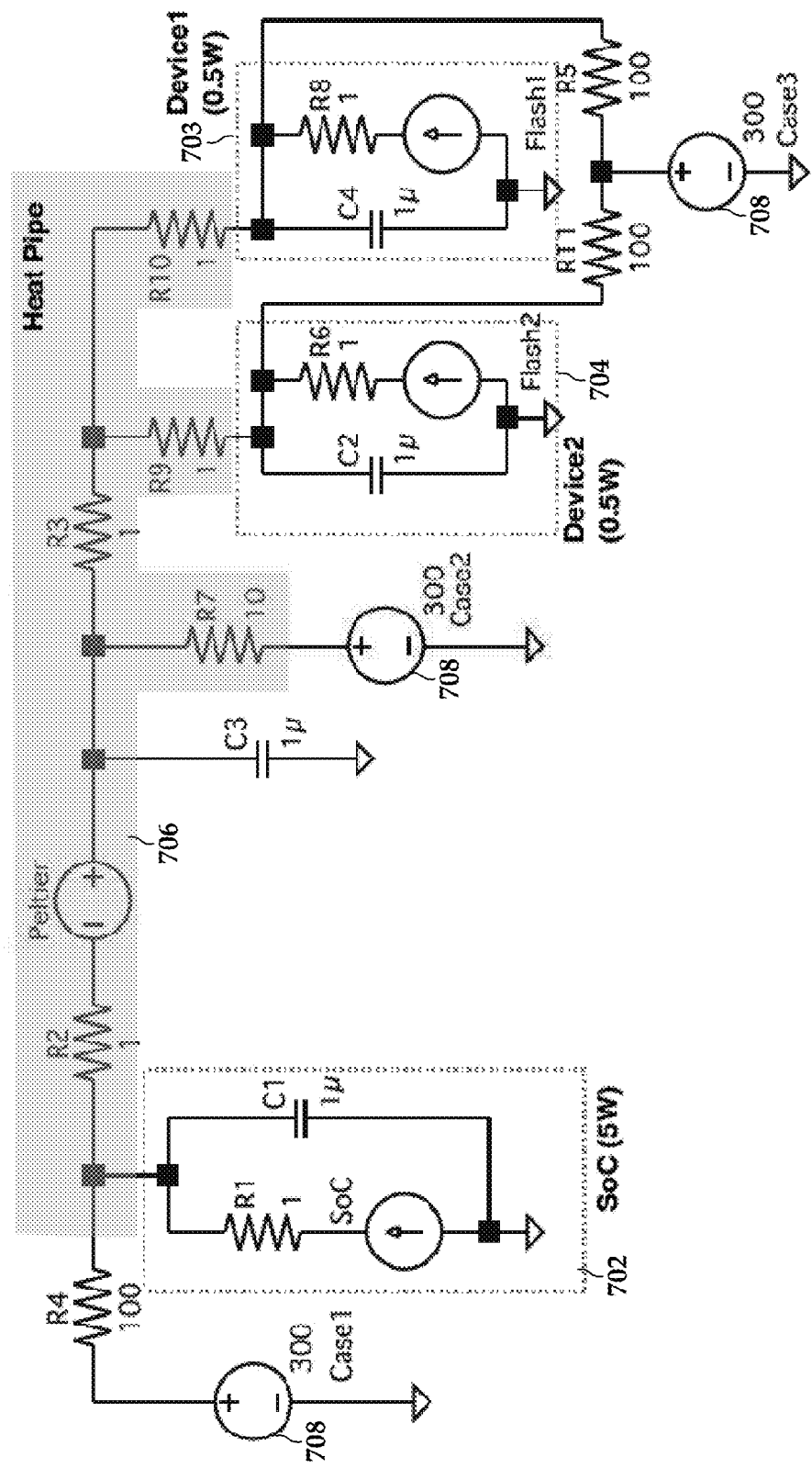
FIG. 7 is a circuit diagram illustrating a thermal simulation of a device according to an example embodiment.

In reference now to FIG. 7, a circuit diagram illustrates a thermal simulation of portions of a data storage device according to an example embodiment. The storage device includes a controller, e.g., SoC 702. Two memory devices 703, 704 are thermally coupled to the controller 702 by way of a switchable heat pipe 706. The switchable heat pipe 706 can selectably apply heat to one or both of the memory devices 703, 704 for thermal annealing or other purposes. A Peltier heat pump 707 also thermally couples the SoC 702 and memory devices 703, 704. A case 708 provides a heat sink for the storage device, and is also coupled to the heat pipe 706. As indicated in the figure, the case 708 is set at a constant 300K. The various resistors in the figure represent resistance to heat transfer between the various components.

Figure 8:
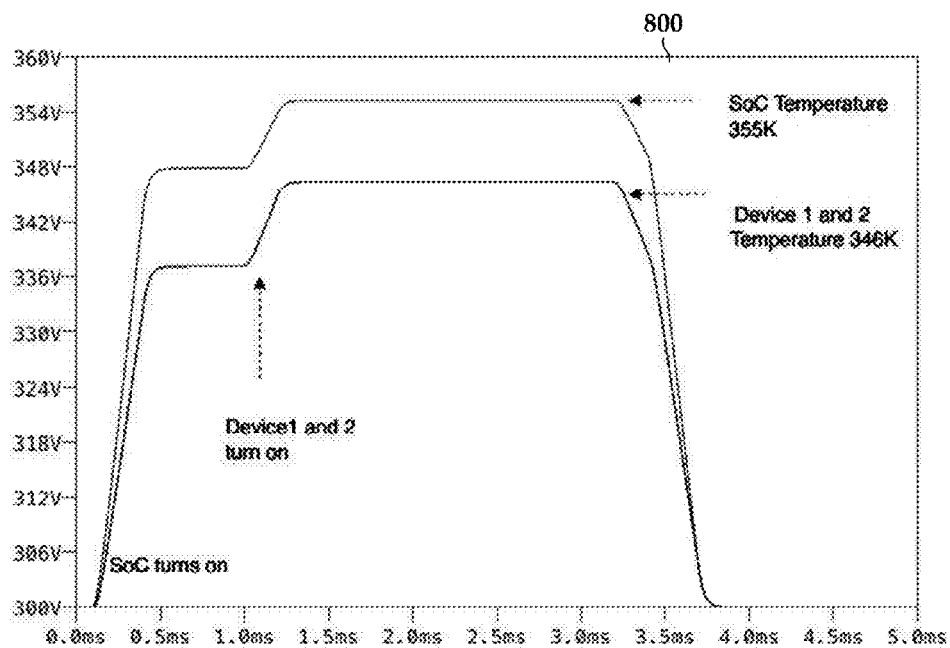
FIGS. 8 and 9 are graphs showing results of the simulation of FIG. 7 for two different modes.

In FIG. 8, a graph 800 illustrates operation of the heat components of FIG. 7 in a first mode. In this mode, the SoC 702 dissipates 5 W when active and the memory devices 703, 704 each dissipate 0.5 W when active. The heat pipe 706 is configured in this example so that the thermal resistance R7 to the case 708 is 10K/W, and thermal resistances R10, R9 to the devices 703, 704 are both one K/W. The Peltier pump 707 is excluded or inactive. As indicated in the graph 800, this results in the devices 703, 704 having a steady-state temperature of 346K and the SoC 702 having a steady-state temperature of 355K.

Figure 9:
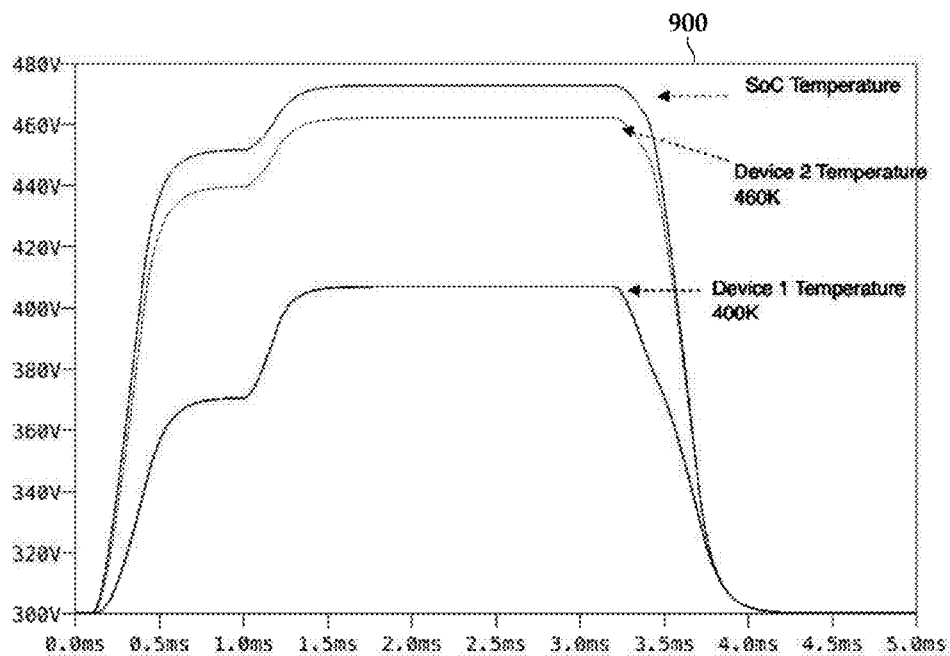

In FIG. 9, a graph 900 illustrates operation of the heat components of FIG. 7 in a second mode. As before, the SoC 702 is dissipating 5 W when active and the memory devices 703, 704 are each dissipating 0.5 W when active. The Peltier pump 707 is excluded or inactive. In contrast the previous example, the heat pipe 706 is configured in this example (e.g., via switchable magnetic elements coupled to the heat pipe 706) so that the thermal resistance R7 to the case 708 is 100K/W, thermal resistance R10 to device 703 is 100K/W, and thermal resistance R9 to device 704 remains 1K/W as before.

As indicated in the graph 900, this results in the device 704 having a much larger steady-state temperature of 460K compared to steady state temperature 400K of the other device 703. The SoC 702 has a steady-state temperature above 470K. This increase in SOC temperature is due to the increase in thermal resistance of R7 between the heat pipe 706 and case 708. By varying R7, the temperature of the heat source (in this case the SoC 702) can be increased thereby increasing the thermal potential between the heat source and the heated device (in this case device 704). If the required temperature of the heated device cannot be met by the heat source (e.g., would require the heat source to exceed a safe temperature) or if some max temperature of the SoC may not be exceeded then the Peltier heat pump 707 can be activated.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
   a heat transfer mechanism comprising a fluid path, a first part of the fluid path thermally coupled to a first region of a higher temperature and a second part of the fluid path thermally coupled to a second region of a lower temperature, the first region comprising a controller of a storage device and the second region comprising a non-volatile, solid-state memory of the storage device, a difference between the higher temperature and the lower temperature inducing a flow of a magnetic fluid through the fluid path; and
   a switchable magnetic device magnetically coupled to the fluid path, activation of the switchable magnetic device causing an aggregation of particles of the magnetic fluid to at least partially block the flow of the magnetic fluid through the fluid path, which reduces heat transfer from the first region to the second region, the switchable magnetic device being deactivated to thermally anneal the non-volatile, solid-state memory.

2. The apparatus of claim 1, wherein the switchable magnetic device comprises an electrical coil.

3. The apparatus of claim 1, further comprising a Peltier heat pump coupled between the first region and the heat transfer mechanism, the Peltier heat pump being activated when the switchable magnetic device is deactivated to assist in the heat transfer from the first region to the second region.

4. The apparatus of claim 1, wherein the heat transfer mechanism comprises at least two branches, the switchable magnetic device being magnetically coupled to the fluid path at a first of the branches and a second switchable magnetic device being magnetically coupled to the fluid path at a second of the branches.

5. The apparatus of claim 4, wherein the first branch is coupled to the second region and the second branch is coupled to a third region of a second lower temperature, independent activation of the switchable magnetic device and the second switchable magnetic device independently altering flows of the magnetic fluid in the first and second branches and thereby altering a second heat transfer from the first region to the third region.

6. The apparatus of claim 4, wherein the first branch is coupled to the first region and the second branch is coupled to a third region of a second higher temperature, independent activation of the switchable magnetic device and the second switchable magnetic device independently altering flows of the magnetic fluid in the first and second branches and altering a second heat transfer from the third region to the second region.

7. A method comprising:
  detecting a condition of an apparatus that is assisted by changing a heat transfer from a first region of a higher temperature to a second region of a lower temperature, a heat transfer mechanism comprising a fluid path being thermally coupled between the first region and the second region; and
  in response to detecting the condition, selectably activating or deactivating a switchable magnetic device magnetically coupled to the fluid path of the heat transfer mechanism, the activation or deactivation of the switchable magnetic device causing particles of a magnetic fluid to respectively block or clear a flow of the magnetic fluid through the fluid path, the blocking or clearing of the flow respectively decreasing or increasing the heat transfer.

8. The method of claim 7, wherein the first region comprises a controller of a storage device, and the second region comprises a non-volatile, solid-state memory of the storage device, the condition comprising charge trapping of flash memory cells and the magnetic device being deactivated to thermally anneal the flash memory cells.

9. The method of claim 7, further comprising activating or deactivating a Peltier heat pump coupled between the first region and the heat transfer mechanism via the blockage or clearance in response to the condition.

10. The method of claim 7, wherein the heat transfer mechanism comprises at least two branches, the magnetic device being magnetically coupled to the fluid path at a first of the branches and a second magnetic device being magnetically coupled to the fluid path at a second of the branches, the method further comprising selectably activating or deactivating the second magnetic device.

11. The method of claim 10, wherein the first branch is coupled to the second region and the second branch is coupled to a third region of a second lower temperature, the method further comprising independently activating the magnetic device and the second magnetic device to independently alter flows of the magnetic fluid in the first and second branches and thereby alter a second heat transfer from the first region to the third region.

12. The method of claim 10, wherein the first branch is coupled to the first region and the second branch is coupled to a third region of a second higher temperature, the method further comprising independently activating the magnetic device and the second magnetic device to independently alter flows of the magnetic fluid in the first and second branches and thereby alter a second heat transfer from the third region to the second region.

13. A system comprising:
  a heat-generating component;
  a heat-receiving component;
  a heat transfer mechanism thermally coupled to the heat-generating component and the heat-receiving component, the heat transfer mechanism comprising a fluid path, a difference of temperature between the heat-generating component and the heat-receiving component inducing a flow of a magnetic fluid through the fluid path;
  a switchable magnetic device magnetically coupled to the fluid path of the heat transfer mechanism;
  a Peltier heat pump coupled between the heat transfer mechanism one of the heat-generating component or the heat-receiving component; and
  a controller coupled to the switchable magnetic device and configured to, in response to detecting a condition that is assisted by changing a heat transfer from the heat-generating component to the heat-receiving component, selectably activate or deactivate the switchable magnetic device to respectively block or clear the flow of the magnetic fluid through the fluid path, the blocking or clearing of the flow respectively decreasing or increasing the heat transfer, the Peltier heat pump activated via the clearance of the flow in response to the condition.

14. The system of claim 13, wherein the heat-generating component comprises a plurality of heat-generating components, the heat transfer mechanism comprising a plurality of heat pipes thermally coupled to the plurality of heat-generating components and the heat-receiving component, and the switchable magnetic device comprising a plurality of electrical coils coupled to the controller, the controller configured to independently alter individual heat flows between the plurality of heat-generating components and the heat-receiving component.

15. The system of claim 14, wherein the heat-receiving component comprises a plurality of heat-receiving components, the plurality of heat pipes thermally coupled to the plurality of heat-generating components and the plurality of heat-receiving components, the controller configured to independently alter individual heat flows between the plurality of heat-generating components and the plurality of heat-receiving components.

16. The system of claim 14, wherein at least one of the plurality of heat pipes comprises two or more branches coupled to two or more of the plurality of heat-receiving components.

17. The system of claim 13, wherein the heat-generating component comprises a plurality of heat-generating components, the heat transfer mechanism comprising a plurality of heat pipes thermally coupled to the plurality of heat-generating components and the heat-receiving component, and the switchable magnetic device comprising a plurality of coils coupled to the controller, the controller configured to independently alter individual heat flows between the plurality of heat-generating components and the heat-receiving component.

18. The system of claim 17, wherein at least one of the plurality of heat pipes comprises two or more branches coupled to two or more of the plurality of heat-generating components.

* * * * *